(12) United States Patent  
Comarow et al.

(10) Patent No.: US 8,233,099 B1  
(45) Date of Patent: Jul. 31, 2012

(54) TEMPORARY BIREFRINGENT COLOR IMAGE APPARATUS AND METHOD

(76) Inventors: Austine Wood Comarow, Las Vegas, NV (US); David Comarow, Las Vegas, NV (US); Rufus Butler Seder, Arlington, MA (US)

( * ) Notice: Subject to any disclaimer, the term of this patent is extended or adjusted under 35 U.S.C. 154(b) by 0 days.

(21) Appl. No.: 13/092,796

(22) Filed: Apr. 22, 2011

(51) Int. Cl.
*G02F 1/1335* (2006.01)

(52) U.S. Cl. ............................................ 349/5; 349/10

(58) Field of Classification Search .................... 349/10, 349/15
See application file for complete search history.

(56) References Cited

U.S. PATENT DOCUMENTS

| | | | |
|---|---|---|---|
| 3,593,433 | A | 7/1971 | Dillon et al. |
| 4,302,260 | A | 11/1981 | Meltzer |
| 5,115,382 | A | 5/1992 | Smith |
| 5,722,762 | A | 3/1998 | Sol |

OTHER PUBLICATIONS

Mann, James, "Austine Wood Comarow: Paintings in Polarized Light" 2005, Wasabi Publishing, Las Vegas, Nevada.
Sanritz Corp. Product Information, 2 web pages downloaded Jan. 26, 2012, www.sanritz-corp.co.jp/english/products/polarizer/linear_polarizer.html.
Sanritz Corp. Product Information, 2 web pages downloaded Jan. 26, 2012, www.sanritz.corp.co.jp/english/products/polarizer/reflector_p.html.
Orient Display, "FAQ LCD Basics," 4 web pages downloaded Jan. 26, 2012 www.oriewntdisplay.com/lcds-basis.html.
Pacific Display Devices, "LCD Viewing Modes and Polarizers," 3 web pages downloaded Jan. 26, 2012, www.tstonramp.com/~pd-dwebacc/lcd_polarizers.htm.

*Primary Examiner* — Phu Vu
(74) *Attorney, Agent, or Firm* — David Camarow

(57) ABSTRACT

Disclosed is an apparatus and method for making temporary colorful birefringent displays. In its preferred embodiment, cellophane 104 is laminated between self-adherent vinyl sheets 108 with non-water soluble adhesive 112 and desired shapes 212 are cut therefrom. Plane polarizing filter 213 is similarly laminated between sheets of self-adherent vinyl 214. One of the polarizer laminations is adhered to a gloss surface such as a window 217. Shapes 212 cut from the cellophane-vinyl laminations are adhered to the polarizer lamination 215. Colors created by the polarized light passing through the birefringent cellophane laminations 100 are viewed through a polarizing analyzer 230 which can be a second lamination of polarizer between self-adherent vinyl sheets and placed over the completed design, or through analyzers held separately from the design such as polarized glasses 218 or hand held viewers 222, 230. Transmissive 214 and reflective 304 and transflective 604 types are disclosed. A less-resilient but less expensive version using low-tack adhesive 710 in place of surface-adherent vinyl 104 is also described. Embodiments and methods are disclosed for using the apparatus as educational devices 400, games, toys 200, hobby activities and making decor and temporary signs 504.

41 Claims, 7 Drawing Sheets

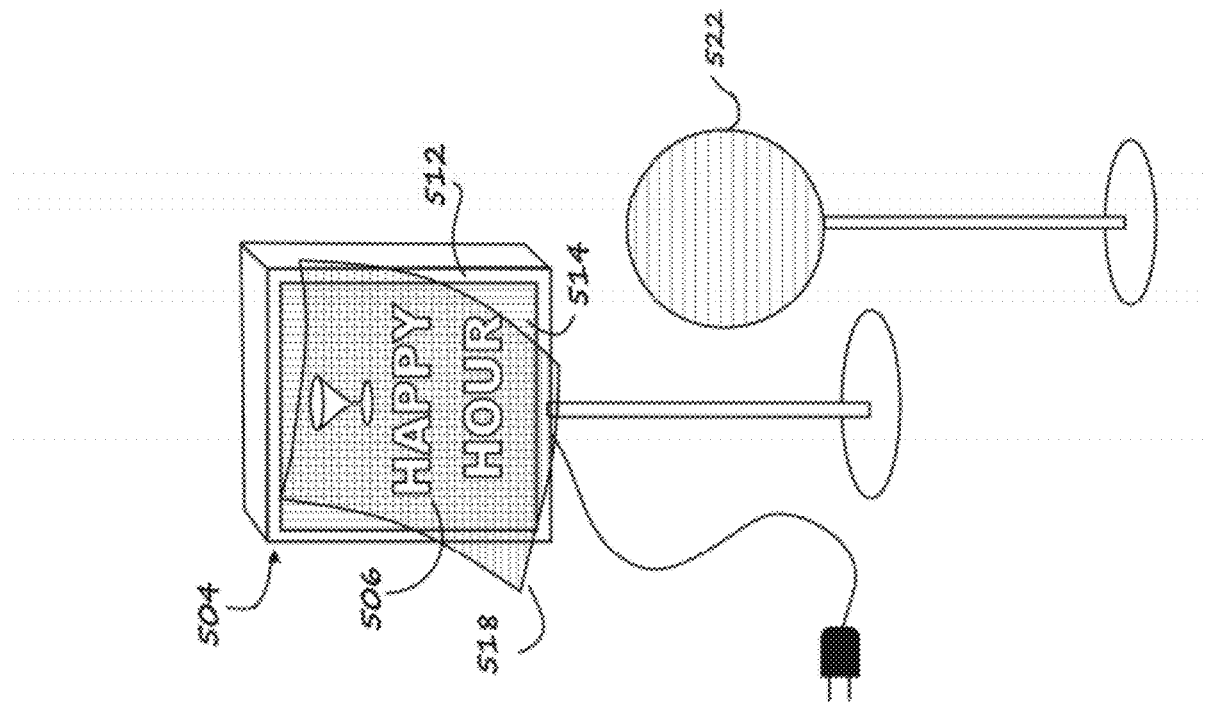
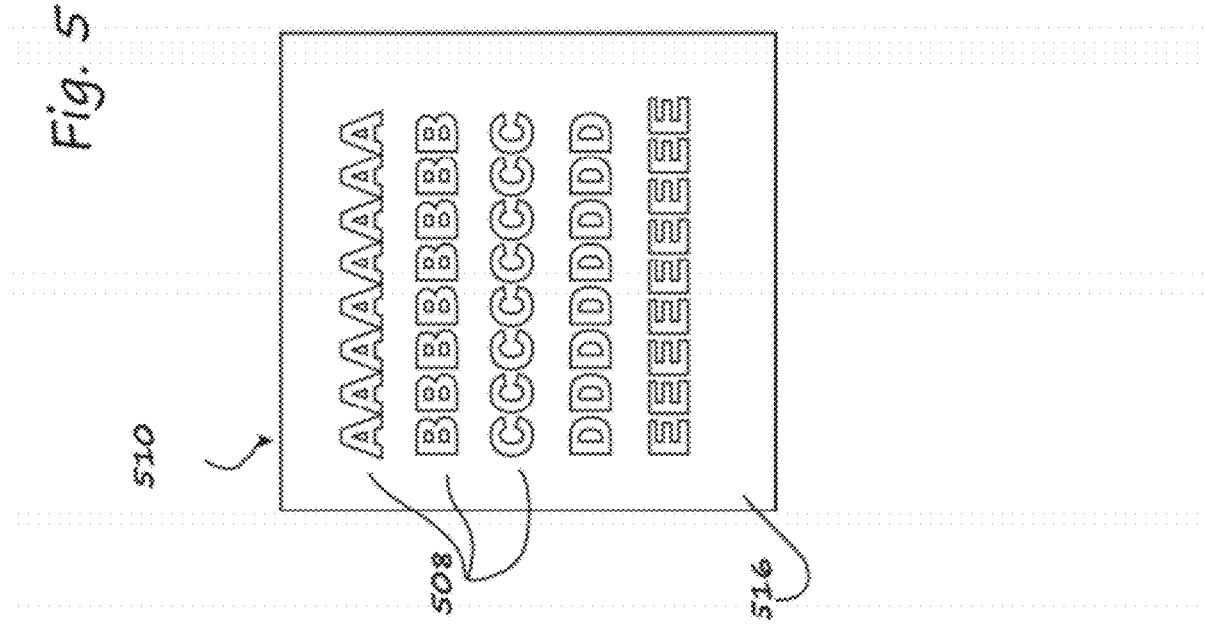
Fig. 5

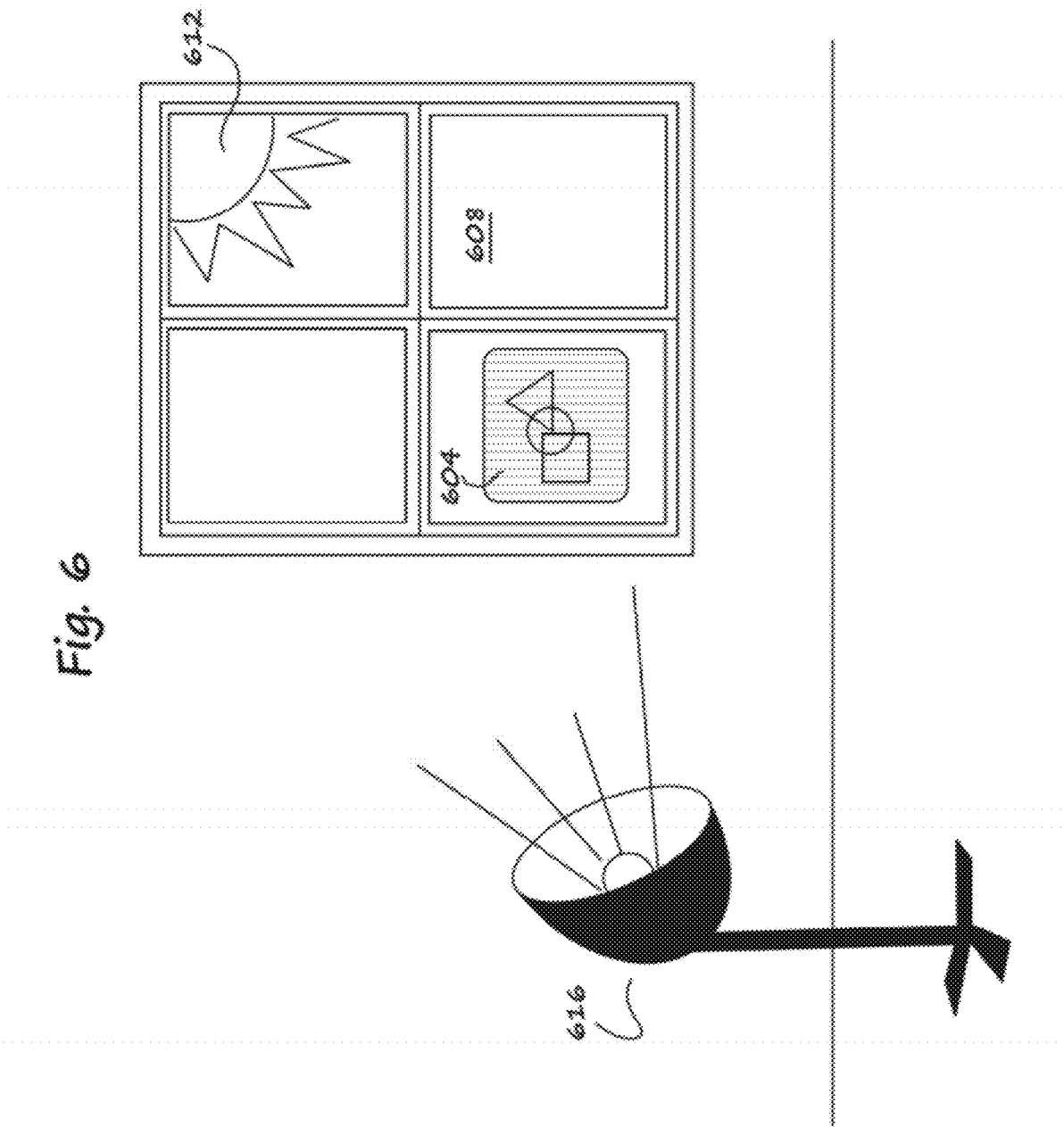

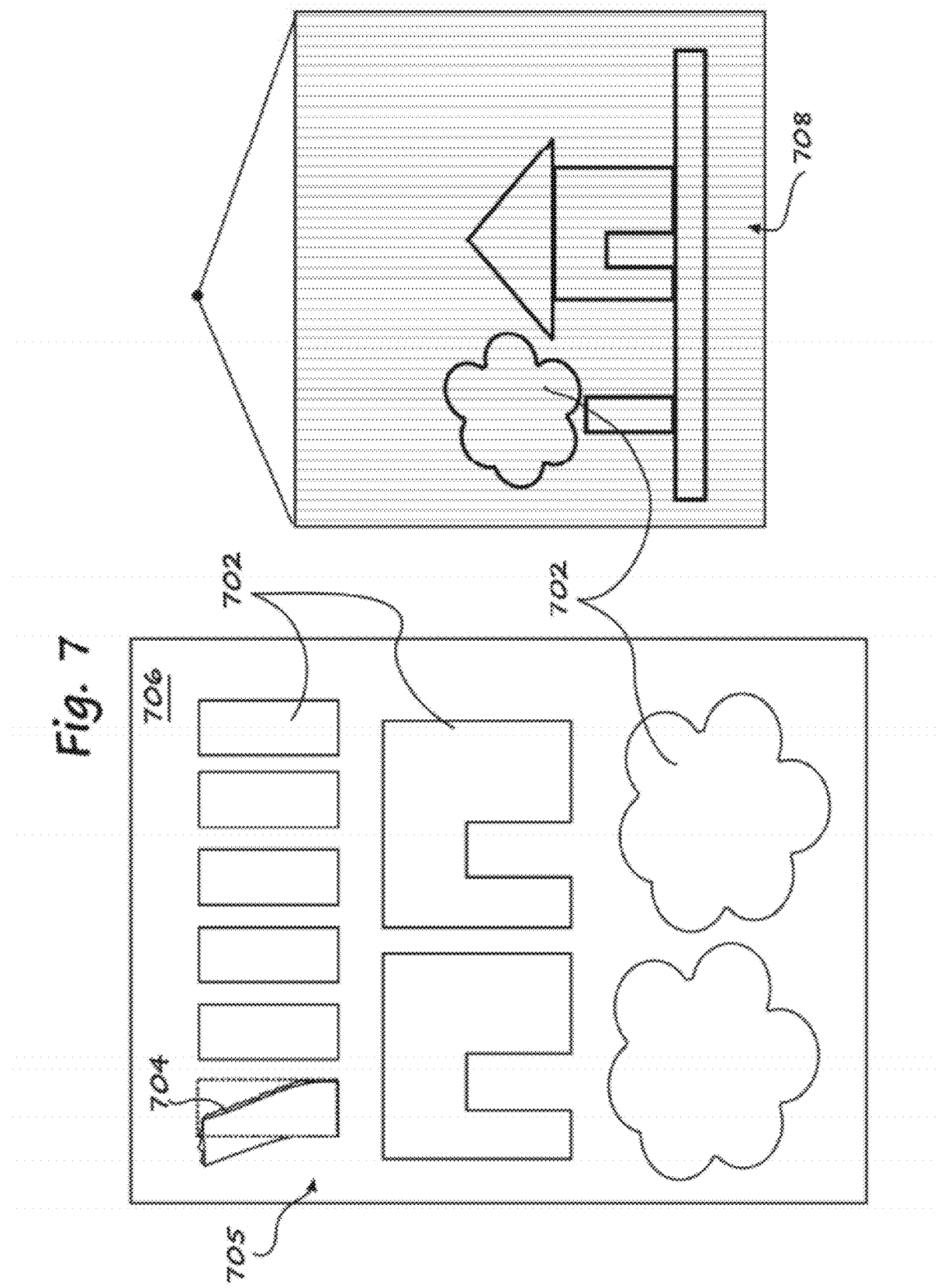

TEMPORARY BIREFRINGENT COLOR IMAGE APPARATUS AND METHOD

REFERENCE TO PRIOR FILED APPLICATIONS

None.

GOVERNMENT LICENSE RIGHTS

None.

FIELD OF THE INVENTION

The present invention relates to images made of birefringent materials and illuminated with polarized light, laminations of birefringent materials and self-adhering materials to create temporary birefringent color displays, and methods of use thereof.

BACKGROUND

The ability to make changeable displays, whether for information, play, way-finding or decorative purposes, is of great importance. The use of changeable symbols or shapes on a background is widely known. The use of replaceable shapes for games and educational purposes is also well-known. However, the ability to create easily changeable images that produce different colors depending on the angle of orientation of the individual pieces or to create different colors and patterns simply by overlapping these same temporarily-adhered pieces is new.

TOYS: In 1951 Harry Kislevitz invented what became a popular toy called "ColorForms." This product relied on the surface adhesion properties of certain opaque colored vinyl and allowed people to create decorative arrangements of various colored shapes on smooth surfaces such as windows or tile. See <http://www.plasticsnews.com/blog/2011/02/happy_60th_to_an_iconic_plasti.html> accessed Apr. 18, 2011. The ColorForms product has essentially remained unchanged for 60 years, but its popularity has decreased owing to lost consumer interest resulting from over-familiarity with the toy, as well as competing activities having changing colors and images such as those using computer displays and the like.

SIGNS: Changing signs such as marquees, menus and directories have long used interchangeable letters and symbols, or erasable drawing material such as wax pencil on edge-lit glass or chalk on a blackboard. Certain temporary display signs have been made that use printed static cling ("surface adherent") vinyl for placement in windows. All of these displays lack color intensity and iridescent quality to necessarily grab attention.

HOBBIES and GAMES: As described above, games utilizing surface adhesive vinyl have been in use since at least 1960. However, interest in such toys has waned. Over the years the approach has been used in such products as pop-up toys and play houses and offered in association with a variety of licensed television and motion picture characters to aid in marketing. A need to modernize and improve this type of activity exists that will effectively compete with electronic distractions of our day such as video games.

DÉCOR: There is great interest in new ways to create decorative objects without the need to use a computer, acquire expensive equipment, to make a mess, or even possess advanced artistic skills. Over the years such approaches have included "Paint by Numbers" invented in 1950 by Max Klein and Dan Robbins (see <http://americanhistory.si.edu/paint/introduction.html> accessed Apr. 18, 2011) and plastic faux stained glass (See e.g U.S. Pat. No. 4,302,260 issued to Meltzer). But these types of activities are considered dated and their popularity has also waned. A need exists to provide a simple way to make interesting, colorful images such as window "sun catchers" that change depending on angle of viewing, are iridescent and can be changed easily. Fine art has been created using birefringent materials and polarized light since shortly after plane polarizing filter was invented by Edwin Land in the 1930's. One of the inventors herein, Austine Wood Comarow, has been creating kinetic and interactive fine art work using birefringent films and polarizing filter since 1967. However, such work is permanent in nature and requires extensive training and skills to create. A need to create a way for hobbyists to use these materials to create interesting and pleasing decor is therefore needed.

EDUCATION: Educational activities, particularly for preschool children, is considered vital to healthy cognitive development. Over the years many educational toys and other apparati have been developed for teaching fundamental childhood educational concepts such as reading. See e.g. U.S. Pat. No. 3,593,433 issued to Dillon in 1970 disclosing a picture board with adherent letters associated with familiar environmental objects. However, in today's world filled with distractions ranging from colorful 3D television to smart phones, holding children's attention is becoming more of a challenge. Therefore, a need exists to provide shapes that become colorful only when viewed through a polarizing sheet ("analyzer"). The "magical" experience of seeing an invisible image suddenly appear in full color and then to be made to immediately change color will aid in keeping the attention of a child.

In developing the present invention, a new type laminated material was needed. It required producing birefringent colors in a controlled and predictable way, it needed to be resilient when handled repeatedly and subjected to light washing, and it needed to be repeatedly adherent and removable. Therefore a new combination of birefringent film such as cellophane and surface adherent (also known as "static cling") vinyl was created. The lamination of the birefringent film between two layers of the vinyl created a sturdy, resilient and repeatably adherent lamination from which desired shapes could be cut. The cutting could be accomplished by hand with knives and scissors, by robotic ("X-Y") cutters, by steel rule dies, by laser cutters and by water jet cutters. Steel rule die cutting was determined to be the best mode for mass production due to its low cost and ability to "kiss cut" the lamination on a release backing.

We also determined that in certain applications, and under certain circumstances (especially where a large number of reuses is not needed or where the materials will be considered "disposable") a means to temporarily and repeatedly adhere plain birefringent material such as cellophane without laminating it between vinyl would be advantageous. The use of "low-tack adhesives on birefringent films was determined to be the best solution in those circumstances.

Therefore, it is the object of this invention to provide a means for untrained members of the public to make colorful, birefringent displays that can quickly be displayed and easily be changed at will.

It is a further object of the present invention to provide a means to create decorative art objects using birefringent materials and polarized light such that the materials are reusable.

It is a further object of the present invention to make easy-to-change signs that are visible only through polarizing filters and changeable.

It is a further object of the present invention to make toys and educational products for children using birefringent materials and polarized light to create exciting and intriguing experiences which both stimulate creativity and reinforce the learning experience.

It is a further object of the present invention to provide a laminated material which is both birefringent to produce controllable colors, surface adherent, repeatably reusable, sturdy and cleanable.

It is a further object of the present invention to provide a means to create birefringent polarized light art using birefringent materials coated with low-tack adhesive.

SUMMARY

To fulfill the above objects, we have developed a set of materials and methods especially adapted to this application.

DEFINITIONS

To avoid confusion and ambiguity, and to aid in defining the scope of the invention claimed, as used herein, the following words will be given the construction denoted:

"Analyzer" shall mean a plane polarizing filter through which the birefringent display described and claimed herein is viewed, whether physically attached to or laid over the display, disposed in space between the viewer and the display or worn by the viewer so as to be held the Viewer's field of vision, as spectacle lenses, hand-held or table-top viewing devices.

"Birefringent film" shall mean any clear material which is birefringent and capable of producing colors when illuminated with polarized light and viewed through an analyzer;

"Display" shall mean any visually perceived pattern;

"Polarizer" shall mean plane polarizing filter producing substantially linearly polarized light;

"Static Cling Vinyl" or "Surface-Adherent" shall mean any polymer that adheres to a smooth or glossy surface without the use of an adhesive whether by static charge or surface adhesion;

BRIEF DESCRIPTION OF THE DRAWINGS

FIG. 5 is a drawing showing the use of the present invention as a changeable sign.

FIG. 6 illustrates an embodiment of the present invention utilizing "transflective" material.

FIG. 7 illustrates an embodiment of the present invention wherein the birefringent shapes are coated with low-tack adhesive and not laminated between layers of vinyl.

DETAILED DESCRIPTION

The present invention utilizes the unique birefringent properties of certain materials such as cellophane and, in some embodiments, the surface-adhering water-proof properties of certain materials such as certain forms of vinyl. By combining the birefringent film with the self-stick properties of the vinyl or low-tack adhesive, we have been able to create a device and method for making easily changeable colorful displays for such uses, without limitation, as signs, games, toys, décor and the like.

Figure 1:
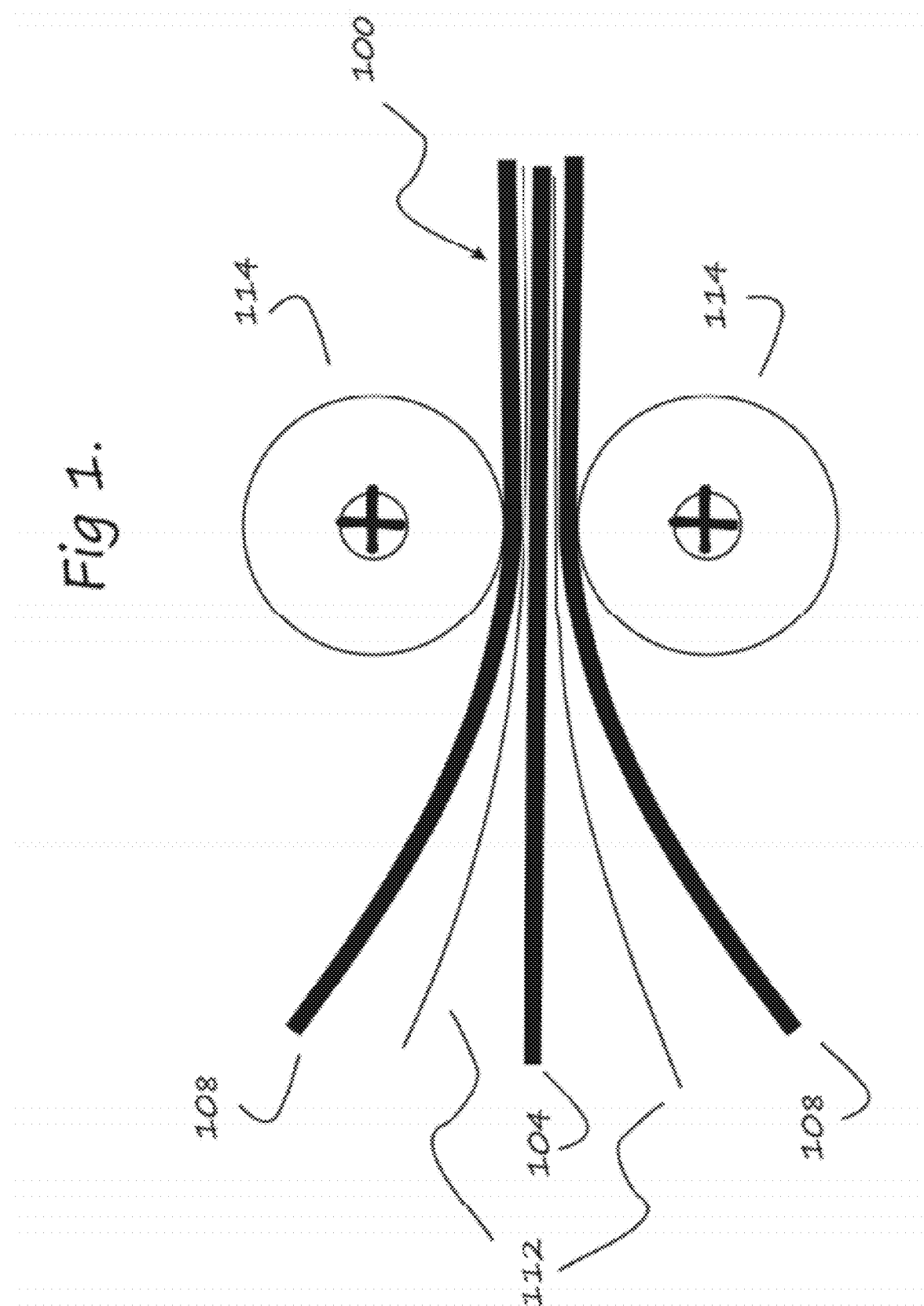
FIG. 1 is a drawing depicting the structure and process of making the lamination of self-stick vinyl and birefringent film.

FIG. 1 depicts the structure and process of making the lamination 100 of the present invention. Birefringent film 104 is laminated between two sheets of surface-adherent vinyl 108 using a non-water soluble adhesive 112 calendared between pressure rollers 114. The birefringent film is preferably comprised of cellophane, but may also be made of a wide variety of materials including, but not limited to biaxially oriented polypropylene, polycarbonate, polystyrene, stressed acrylic, polyethylene, polyester, copolymers of polyethylene terephthalate (e.g. PETG) and polyvinylchloride (PVC or "Saran"). The birefringent film 104 may, itself comprise one or more layers of birefringent film laminated to each other to achieve the desired colors in polarized light. Such laminations of birefringent film may use similar non-water-soluble adhesive or heat-sealing polymers such are widely known in the packaging industry as used for sealing cellophane packaging. The use of non-water-soluble adhesive 112 for all parts of the lamination 100 assures the lamination will not come apart if it gets wet such as when cleaning. The adhesive 112 may be liquid applied to the components or may be a solid adhesive (as illustrated here) such as MACtac Permaprint Mounting Film stock number IP 2002. The more impervious to water the adhesive 112 is, and the more complete it coats and seals the birefringent material 104 the better. This is especially true if cellophane is used as the birefringent material 104 as cellophane is hygroscopic. We tested a lamination of cellophane and surface-adherent vinyl using MACtac Permaprint mounting film by boiling it for 5 minutes with no sign of delamination or deterioration. An alternative adhesive for adhering the birefringent material 104 to the surface-adherent vinyl 108 is a heat sealable polymer discussed above and widely used in cellophane manufacturer. However, the minimum sealing temperature must be lower than will cause damage or distortion to the vinyl which can interfere with its adhesion to smooth surfaces or cause unwanted optical changes. For this reason, a pressure-sensitive adhesive such as the mounting film disclosed above is preferred.

Figure 2:
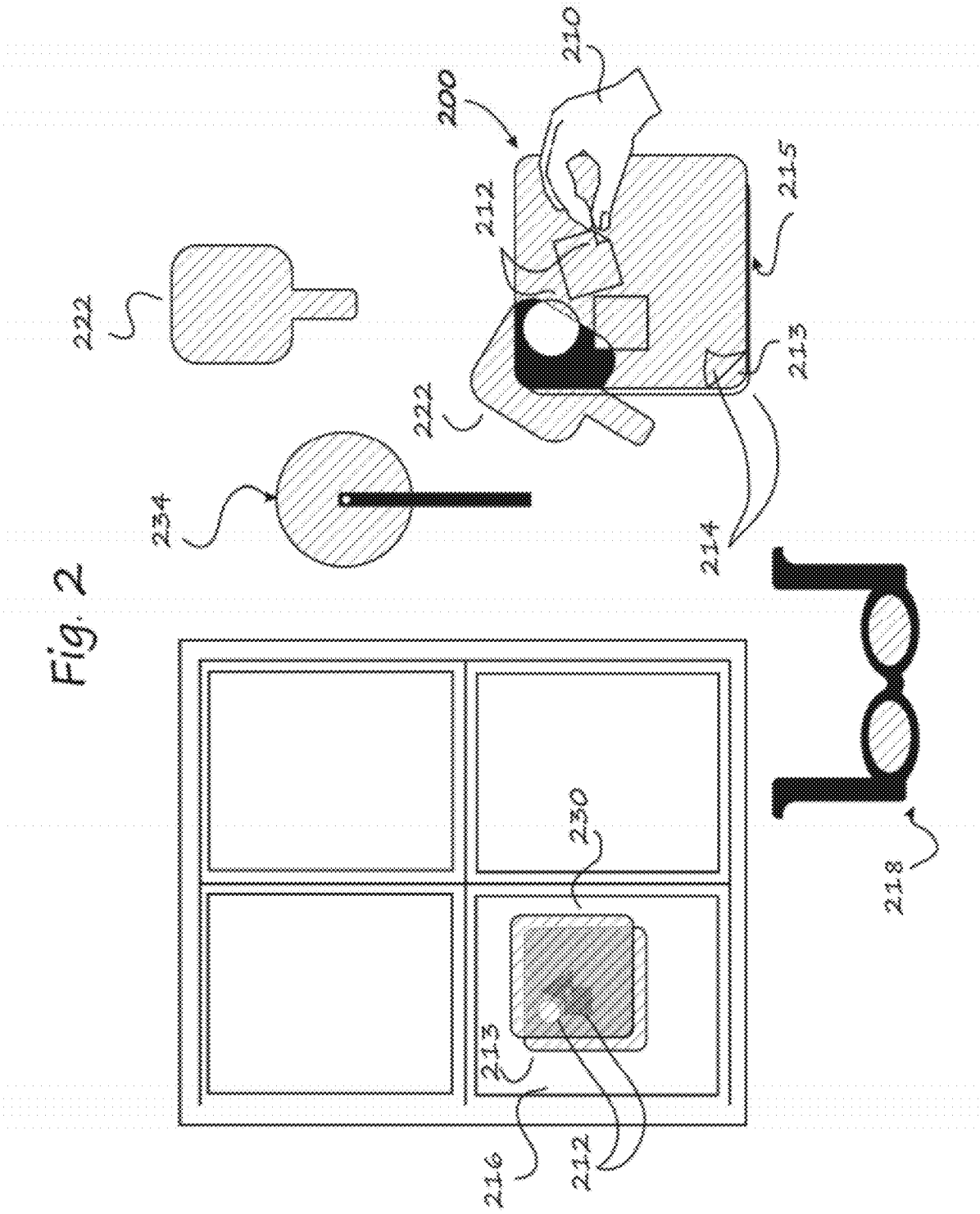
FIG. 2 is an illustration an embodiment of the present invention whereas it is implemented as a toy.

FIG. 2 illustrates the use of the present invention as a toy 200 in which the participant 210 peels shapes 212 of the lamination 100 described above and adheres them to a sheet of polarizing material 213. The polarizing material 213 is preferably laminated between two sheets of the same kind of self-adhering vinyl 214 but may also be used directly as the substrate upon which the shapes are adhered. The polarizer shown in FIG. 2 is the transmissive type, so it requires backlight. Here, the participant has placed the polarizer on a window pane 216 and created a "sun-catcher" or faux stained glass display. Alternatively a light box, flat screen video display or other light source may be used. The participant can look through a polarizing analyzer such as polarized glasses 218 or a polarizing sheet viewer 222 to view the assembly of shapes. Once the participant completes the design, a second piece of polarizer (the analyzer) 230 can be adhered over the surface of the design to create a finished artwork that is viewable without the need to look through a separate analyzer such as polarized spectacles or other viewer. The finished artwork can then be disassembled and a new one made with the same materials. Preferably the second polarizer 230 is also made as a lamination of polarizing filter 213 between two pieces of self-stick vinyl 214 forming a lamination 215. Alternatively, the analyzer can be held in place with tape, hung from a suction cup hook or otherwise held over the completed work. The analyzer can also be omitted and viewers can look at the completed work through any of a number of types of polarizing filters such as polarized glasses 218, hand-held polarizers 222 or rotating polarizers 234, either hand-turned (as shown here) or motorized (not shown). If a flat screen LCD type display is used as a back-light source, the polarizer incorporated in the display itself may substitute for the rear polarizing sheet 215.

Figure 3:
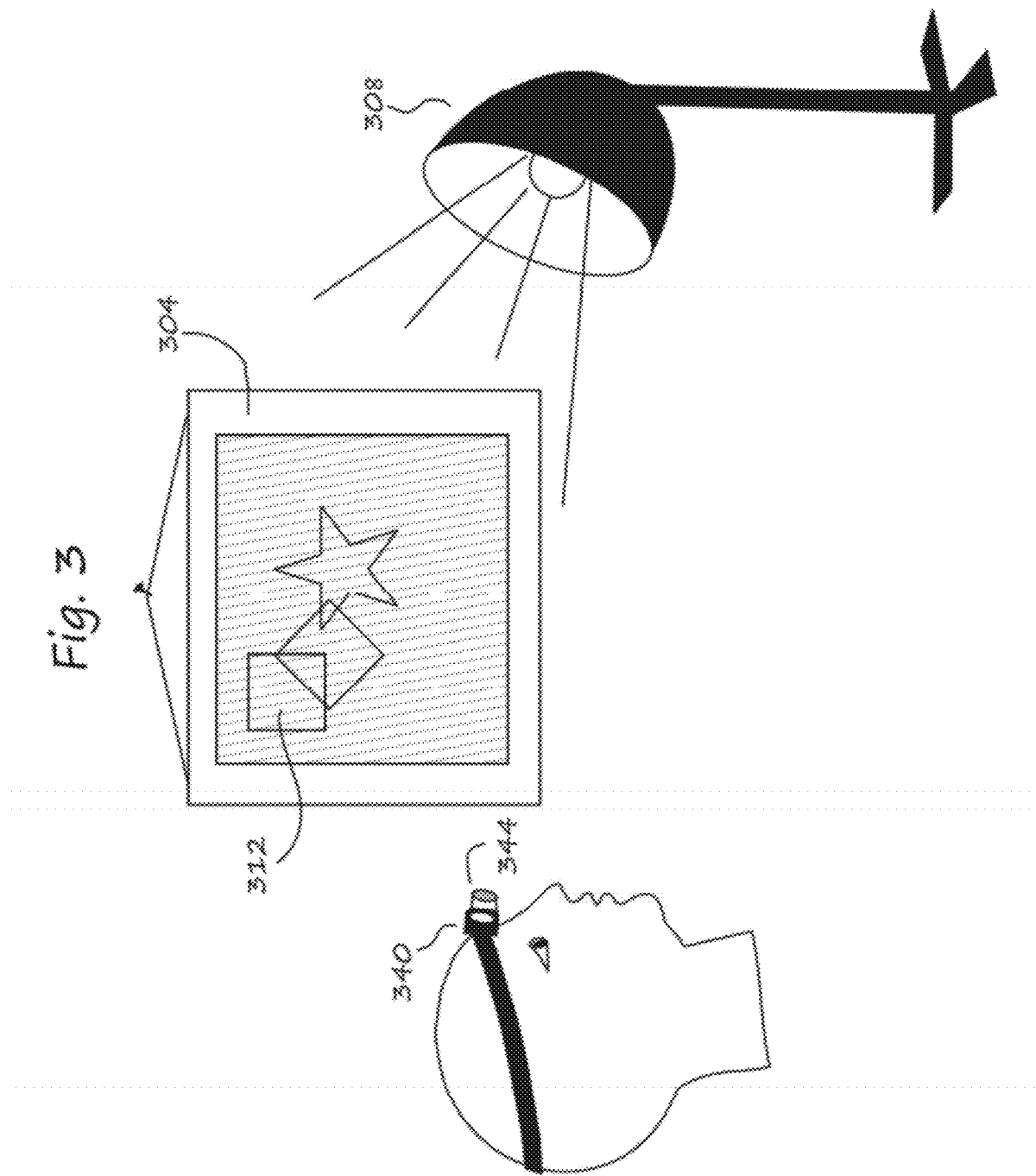
FIG. 3 is an illustration showing an embodiment of the present invention using a reflective type polarizer.

FIG. 3 illustrates an alternative embodiment in which the polarizer is reflective 304 and the source of light 308 is from the front of the display 312. Reflective polarizer is manufactured using an aluminized reflector. A head lamp 340 such is well known can be used such as described in U.S. Pat. No. 5,115,382 issued to Smith. In an alternate embodiment, a polarizer 344 can be placed over the headlamp to project polarized light onto the display, thereby making its colors visible.

Figure 4:
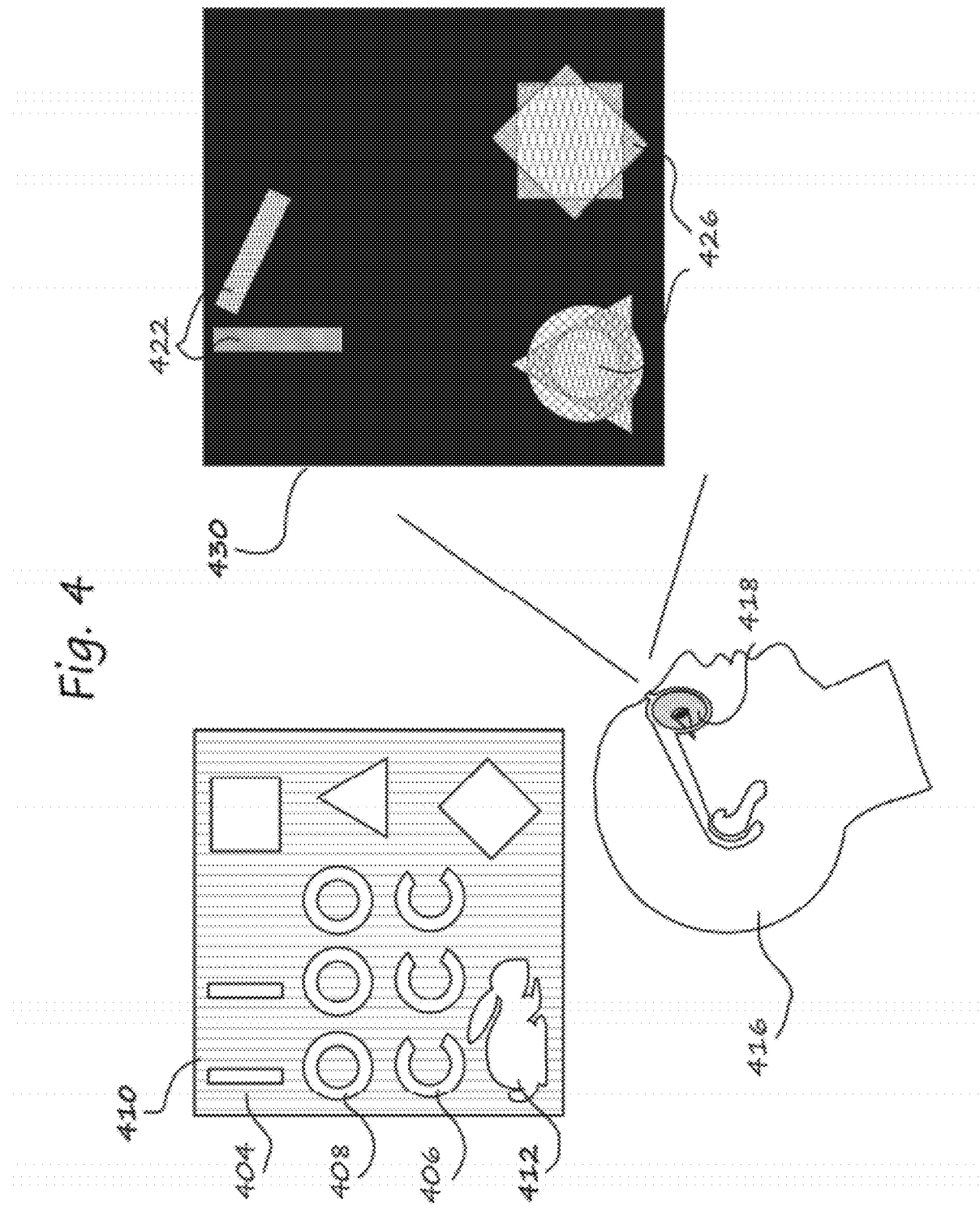
FIG. 4 illustrates the use of the present invention as an educational device.

FIG. 4 illustrates the use of the present invention as an educational device 400 to teach elementary subjects such as letter formation, word identification and the like. Here, components of letters such as straight lines 404, curves 406 and circles 408 are provided as shapes formed from the birefringent-vinyl lamination described above and adhered to a release sheet 410. Pictures of objects 412 can also be provided. The pupil 416 wears polarized glasses 418 to see the various shapes 404, 406, 408 magically appear and, when rotated 422 and/or overlapped 426, dramatically change color when adhered to a polarizer 430.

FIG. 5 shows the use of the present invention as a changeable sign 504. Here, words 506 are formed from letters 508 cut from the birefringent vinyl lamination 510 described above and adhered to a back-lit glass plate 512 having a polarizer 514 adhered thereto. The polarizer 514 is preferably laminated between two sheets of self-adhering vinyl as described above. The letter-shaped laminations 508 are adhered to a smooth release sheet 516 for easy removal and placement on the sign 504. In this embodiment, once the words and/or symbols are placed on the sign 504, a lamination 518 of polarizer between two sheets of self-adhering vinyl is adhered over the sign 504 making it visible. Alternatively, to add a "magical touch," the front polarizer can be omitted and the sip made only visible through a separate polarizer 522. In this way, the sign can be "discovered" by passerbys who glimpse it as they move past. Such a sign or similar display can be used as a polarized sunglass demonstrator (also known in the art as a "sunglass tester") wherein the display is visible only when viewed through polarized sunglasses.

FIG. 6 illustrates the use of "transflective" polarizer 604 behind the display. Transfective polarizer is made with a partly reflective backing such that light can pass through from the rear or be reflected from the front. This allows the display to be seen either in a window day or night, or on a wall, for example. Here, the transflective polarizer 604 is shown laminated between two sheets of self-adhering vinyl as described above, and adhered to a window 608. In the daytime, daylight 612 illuminates the display from the rear. At night, a room light 616 illuminates the display from the front. Because of the inefficiency of both reflection and transmission of transflective polarizer, such a device requires significantly more light than a purely reflective or purely transmissive type. This is not to teach away from using transflective material, but to point out the need for special consideration (adequate lighting) when using it.

FIG. 7 illustrates an alternative embodiment in which the birefringent material 702 is not laminated between vinyl, but instead coated on at least one side with clear-drying low-tack adhesive 704 (classified as "peelable or ultra-peelable" in the label industry). Such adhesive is similar to that used in the well-known 3M Company Corporation product "Post-It® products." This embodiment allows repositioning of the birefringent shapes 702 but is much less resilient than the vinyl laminated embodiment. Shown here is a tableau 705 of miscellaneous shapes adhered to a release backing 706. Further, in this embodiment, the plane polarizer 708 on which the shapes are adhered need not be enclosed in vinyl but can be standard polarizer, preferably protected on both sides, typically with triacetate, during manufacture. Polarizer which is not protected on one side is not as resilient as that protected on both sides and is highly susceptible to moisture attack, but may be somewhat less costly. This type of apparatus would be less expensive to manufacture then the vinyl-laminated birefringent material described above, but is not nearly as resilient and not washable. Nevertheless, such a design is advantageous where numerous re-uses of the same cut shapes are not needed, or where the components are considered "disposable."

Any of the foregoing embodiments may be used as a sunglass tester as previously described.

Preferred Embodiment

As discussed above, the preferred embodiment of the invention comprises cellophane laminated between two sheets of surface adherent vinyl having a minimum thickness of 0.060". A variety of thicknesses of cellophane are used to provide a variety of colors. The thicknesses are selected by visually inspecting each source of cellophane using polarizing filters on both sides of the cellophane and back-lighting it. The laminations of cellophane and vinyl are steel rule die kiss-cut into desired shapes and, where feasible, the matrix is removed. An outline around each die-cut shape is preferably printed or embossed on the backing release paper to aid in identifying their location. Color or style of the printed or embossed lines will differentiate the color produced by each thickness of cellophane. Two pieces of plane polarizing filter of nominally 0.010" thickness are laminated between two sheets of clear surface-adherent ("static cling") vinyl of a minimum 0.060" thickness. The preferred polarizer is the Iodine type with triacetate protection on both sides as is well-known in the industry. Any other type of polarizer, such as dye type, will be acceptable, but the more neutral the color and the more highly efficient the polarizer is, the better. We have found HN38 type polarizer to be a good choice. In use, one of the two laminated polarizing filter-vinyl combinations is adhered to a smooth surface such as a day-lit window or computer screen that is programmed with a luminous white blank field. Shapes die-cut form the cellophane-vinyl laminations are selected by the user and adhered to the first polarizer-vinyl combination. The user wears polarized glasses—either polarized sunglasses or cardboard purpose-made spectacles—to see the birefringent materials during assembly. Once the design is deemed complete, the second piece of polarizing filter-vinyl lamination is adhered over the entire design to create a temporary but stable assembly that is viewable without an analyzer such as polarized spectacles or handheld polarizing viewer. If the user desires to change the design, the cover polarizer is simply peeled off and then the individual pieces of cellophane-vinyl lamination are moved, removed or replaced, and the design is remade. Preferably the vinyl is non-phthalate and non-toxic. The cut-out pieces of cellophane-vinyl laminations are large enough so as not to pose a choking hazard, especially in applications intended for children. The polarizer is HN-38 iodine type polarizer. The adhesive is non-water soluble. While the foregoing is considered to be the best mode of making and using the present invention, it is not intended to be limiting, or to implicitly teach away from other modes.

The specific implementations disclosed above are by way of example and for enabling persons skilled in the art to implement the invention only. We have made every effort to describe all the embodiments we have foreseen. There may be embodiments that are unforeseeable or which are insubstantially different. We have further made every effort to describe the invention, including the best mode of practicing it. Any omission of any variation of the invention disclosed is not intended to dedicate such variation to the public, and all unforeseen or insubstantial variations are intended to be covered by the claims appended hereto. Accordingly, the invention is not to be limited except by the appended claims and legal equivalents.

What is claimed is:

1. An apparatus for making temporary color displays comprising sheets of birefringent film, said sheets of birefringent film laminated to at least one sheet of clear substantially non-birefringent releasably adherent material, at least one sheet of plane polarizing filter, at least one analyzer polarizing filter, at least one adherable surface, a light source, said laminated sheets of birefringent film and releasably adherent material cut into shapes, said shapes removably adhered to said polarizing filter, said light source illuminating the combination of said shapes and said sheet of plane polarizing filter, said shapes viewed through said analyzer.

2. The apparatus of claim 1 wherein said polarizing filter is transmissive and said light source is disposed behind said device.

3. The apparatus of claim 1 wherein said releasably adherent material is surface-adherent vinyl.

4. The apparatus of claim 1 wherein said releasably adherent material is any substantially non-birefringent material coated on at least one surface with adhesive.

5. The apparatus of claim 1 wherein said polarizing filter is incorporated in a liquid crystal display.

6. The apparatus of claim 1 wherein said polarizing filter is reflective and said light source is disposed in front of said device.

7. The apparatus of claim 1 wherein said polarizing filter is transflective and said light source may be disposed either behind or in front of said device.

8. The apparatus of claim 1 wherein said sheet of birefringent material is laminated between 2 sheets of said surface-adherent vinyl.

9. The apparatus of claim 8 wherein said lamination of birefringent material and said vinyl is washable in water.

10. The apparatus of claim 1 wherein said birefringent film is selected from a group of birefringent materials consisting of cellophane, biaxially oriented polypropylene (BOPP), polycarbonate, polystyrene, stressed acrylic, polyethylene, polyester and polyvinylchloride (PVC).

11. The apparatus of claim 1 wherein said substantially non-birefringent releasably adherent material is selected from vinyl, polyvinylacetate and polyvinylalcohol.

12. The apparatus of claim 1 wherein said adherable surface is transparent.

13. The apparatus of claim 1 wherein said adherable surface is reflective.

14. The apparatus of claim 8 further including a wearable light source disposed in close proximity to the eyes of the person viewing said device.

15. The apparatus of claim 1 wherein said device is a toy.

16. The device of 1 wherein said device is a puzzle.

17. The apparatus of claim 1 wherein said device is a sign.

18. The apparatus of 1 wherein said device is a decorative object.

19. The apparatus of 1 wherein said device is a polarized sunglass demonstrator.

20. A apparatus for making a sign comprising sheets of birefringent film, said sheets of birefringent film laminated to at least one sheet of clear substantially non-birefringent releasably adherent material, at least one sheet of plane polarizing filter, at least one projected polarizing light source, at least one adherable surface, said laminated sheets of birefringent film and releasably adherent material cut into shapes, said shapes removably adhered to said polarizing filter, said projected polarizing light source illuminating the combination of said shapes and said polarizing filter.

21. The apparatus of claim 20 wherein said polarizer is at least partially transmissive and said projected polarizing light source is behind said sign.

22. The apparatus of claim 20 wherein said polarizer is at least partially reflective and said projected polarizing light source is in front of said sign.

23. A method for making a colorful temporary display comprising the steps of:
   a. selecting at least one thickness of birefringent material so as to produced desired colors when appropriately illuminated with polarized light and viewed through a polarizing analyzer at least 2 angles,
   b. providing a permanent non-birefringent clear-drying adhesive,
   c. forming at least one lamination of birefringent film and removably adherent non-birefringent material using said permanent adhesive, said birefringent film selected on the basis of its said desired color,
   d. providing a light source,
   e. providing a sheet of plane polarizing filter,
   f. cutting shapes from said lamination,
   g. removably adhering said shapes from said lamination of birefringent film and removably adherent material to said plane polarizing filter,
   h. illuminating the combination of said laminations of birefringent film and removably adherent material and said polarizing filter,
   i. disposing a plane polarizing analyzer between said adhered shapes and the viewer viewing said display,
   j. viewing said shapes.

24. The method of 23 wherein said sheet of plane polarizing filter is laminated on at least one side to a sheet of substantially non-birefringent removably adherent material.

25. The method of 23 wherein said removably adherent material comprises transmissive self-adherent vinyl.

26. The method of 23 wherein said removably adherent material comprises any substantially non-birefringent transmissive material coated on at least one side with peelable or ultra-peelable adhesive.

27. The method of 23 wherein said plane polarizing filter is transmissive and said light source is disposed behind said display.

28. The method of 23 wherein said plane polarizing filter is reflective and said light source is disposed in front of said display.

29. The method of 23 wherein said plane polarizing filter is transflective and said light source is located wither behind or in front of said display.

30. The method of 23 wherein said birefringent film is selected from a group of birefringent materials consisting of cellophane, biaxially oriented polypropylene, polycarbonate, polystyrene, stressed acrylic, polyethylene, polyester and polyvinylchloride.

31. The method of 23 wherein said display is used to demonstrate polarized sunglasses.

32. The method of 23 wherein said display is used as a toy.

33. The method of 23 wherein said display is used as a game.

34. The method of 23 wherein said display is used as an educational device.

35. The method of 23 wherein said display is used as a sign.

36. The method of 23 wherein said display is used to create décor.

37. A laminated product comprising a first sheet of vinyl, a second sheet of vinyl, a sheet of birefringent material, said birefringent material adhered to and disposed between said first and said second sheets of vinyl.

38. The laminated product of claim 37 wherein said birefringent material is cellophane.

39. The laminated product of claim 37 wherein said birefringent material is adhered to said vinyl with a non-water soluble adhesive.

40. The laminated product of claim 37 wherein said cellophane is adhered to said vinyl using a heat-sealable material.

41. The laminated product of claim 37 wherein said laminated material is washable.

* * * * *